US006945869B2

(12) United States Patent
Kim et al.

(10) Patent No.: US 6,945,869 B2
(45) Date of Patent: Sep. 20, 2005

(54) APPARATUS AND METHOD FOR VIDEO BASED SHOOTING GAME

(75) Inventors: Ju Wan Kim, Daejon (KR); Byung Tae Jang, Daejon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 10/456,501

(22) Filed: Jun. 9, 2003

(65) Prior Publication Data

US 2004/0077393 A1 Apr. 22, 2004

(30) Foreign Application Priority Data

Oct. 17, 2002 (KR) ................................. 10-2002-0063496

(51) Int. Cl.[7] .................................................. A63F 13/00
(52) U.S. Cl. ............................................. 463/2; 463/32
(58) Field of Search ................................ 463/2, 30–34, 463/37–38

(56) References Cited

U.S. PATENT DOCUMENTS 6,738,059 B1 * 5/2004 Yoshinaga et al. .......... 345/419

* cited by examiner

Primary Examiner—Kim Nguyen
(74) Attorney, Agent, or Firm—Mayer, Brown, Rowe & Maw LLP

(57) ABSTRACT

A shooting game is provided based on videos reproduced on a computer by using an augmented reality technology. A 3D graphic object is matched with an existing video by rendering the 3D graphic object and a segmentation object mask of the existing video is overlaid on the 3D graphic object. As a result, three-dimensional effect of the game environment is greatly increased. Further, interactions between the computer and a gamer can be processed by using a gun simulator such as a mouse, a key board, a joystick, and the like. Since the game is played based on the video containing actual elements, the reality of the game environment is greatly enhanced compared to conventional cases where only virtual elements created by using computer graphics are utilized. Therefore, it becomes possible to produce a game having more various interesting scenario with a more real-world-like game environment.

8 Claims, 3 Drawing Sheets

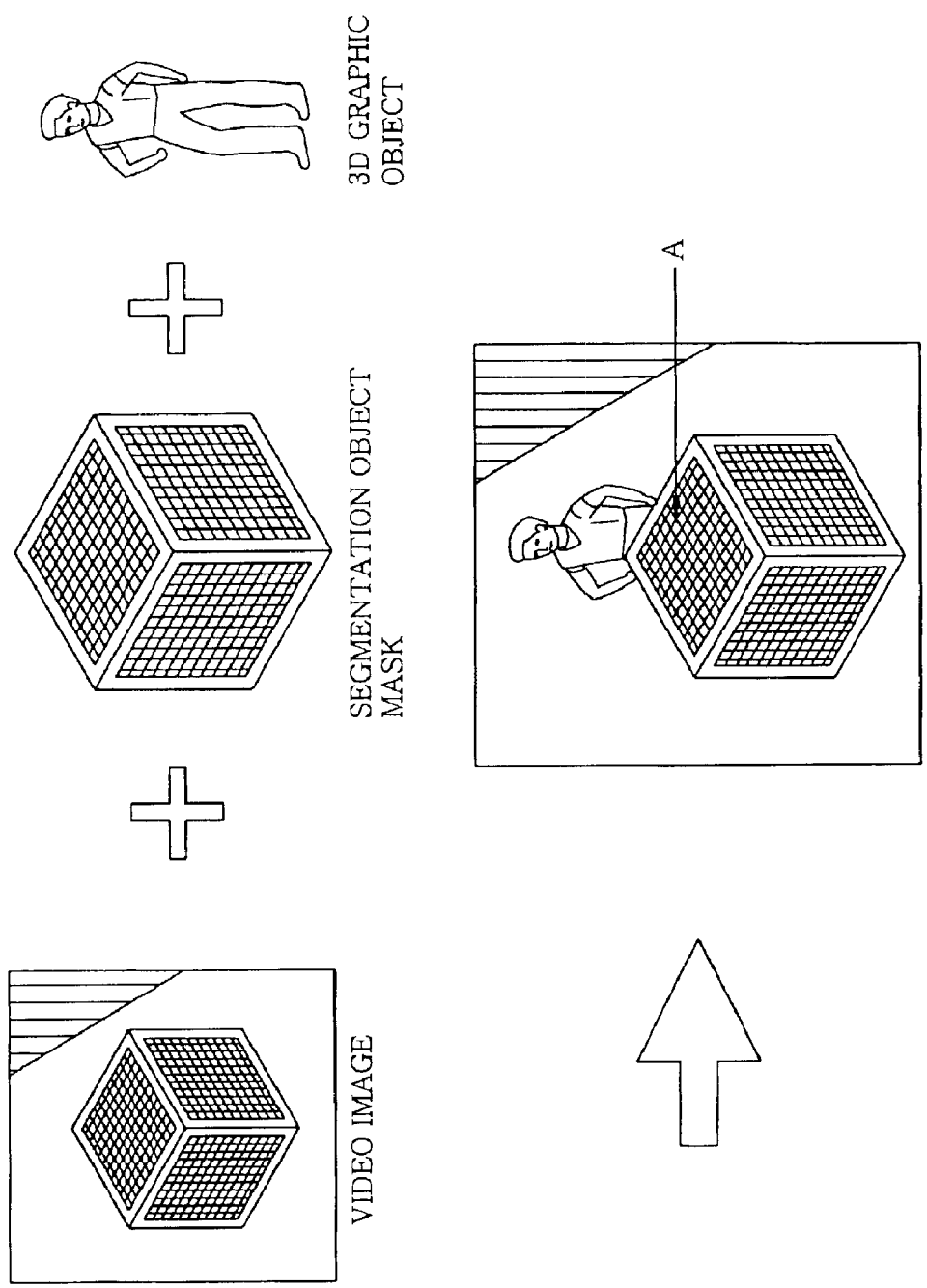

APPARATUS AND METHOD FOR VIDEO BASED SHOOTING GAME

FIELD OF THE INVENTION

The present invention relates to an apparatus and a method for a video-based shooting game; and, more particularly, to an apparatus and a method for a shooting game based on video reproduced on a computer by using an augmented reality technology, the augmented reality being defined as an environment including both real-world elements and computer-generated elements.

BACKGROUND OF THE INVENTION

Conventional shooting game systems have drawbacks in that they are not realistic because games are played in a virtual environment produced by using computer graphics.

Thus, there have been made many attempts to remodel environment for the games by using the computer graphics for the purpose of enhancing reality thereof. These days, pictures of real environment have been partially used, which prove to make a game environment more realistic. Such a more realistic environment, however, is still different a lot from the real environment. Such disadvantage of the conventional shooting game systems is apparently brought out when compared with a case where a video of an actual event is utilized, effectively providing a more real-world-like game environment.

SUMMARY OF THE INVENTION

It is, therefore, an object of the present invention to provide a video-based shooting game apparatus and a method therefor capable of matching of a 3D graphic object with an existing video by rendering the 3D graphic object through the use of internal parameters and external parameters of a video camera, the video camera being synchronized with the 3D graphic object.

It is another object of the present invention to provide a video-based shooting game apparatus and a method therefor capable of implementing a more real-world-like game environment by overlaying an object serving as a foreground among the existing video over the 3D graphic object by considering the contextual relationship of the existing video and the 3D graphic object.

In accordance with one aspect of the present invention, there is provided a method for a video-based shooting game in a computer system, including the steps of: receiving game data having a video data stream obtained by taking a picture of a background for the shooting game, a camera parameter data stream attained in a frame unit, an object data stream produced by using computer graphics, a script data stream for managing interactions between a computer and a gamer, and a foreground segmentation data stream to be located at a foreground of a scene; reproducing the video data stream; performing a rendering of the object data stream in a frame unit by using the camera parameter data stream; overlaying the foreground segmentation data stream in order to improve a 3D effect; and processing interactions with a gamer by using a gun simulator and processing the script data stream to control behaviors of the object data stream.

In accordance with another aspect of the present invention, there is provided a video-based shooting game apparatus in a computer system, including: a data inputting unit for receiving a video data stream obtained by taking a picture of a background for the shooting game, a camera parameter data stream attained in a frame unit, an object data stream produced by using computer graphics, a script data stream for managing interactions between a computer and a gamer, and a foreground segmentation data stream to be located at a foreground of a scene; a game controller for relating game situation information corresponding to each data stream provided from the data inputting unit to a given scenario; an input/output processor for determining whether a certain point is hit when an inputted trigger corresponding to a shooting operation of the gun simulator is received; an interactive script processor for receiving the game situation information related to the scenario from the game controller and the shooting information of the gun simulator from the input/output processor and searching for information specifying actions that should be taken at a time when an image of the object data stream is hit by the gun simulator; a video reproduction controller for ordering to quit or start a reproduction of video depending on the found action information provided from the interactive script processor; a 3D object rendering controller for performing a rendering of the object data stream by using the camera parameter data stream corresponding to time information of the video being currently reproduced, the time information being provided from the video reproduction controller, thereby obtaining a 3D object rendering image; a segmentation object overlay controller for reading the information on the segmentation object mask corresponding to the time information provided from the video reproduction controller; and an image composition unit for overlaying the 3D object rendering image provided from the 3D object rendering controller over an existing video and then overlaying thereon again an image of the foreground segmentation data stream offered from the segmentation object overlay controller, thereby outputting a frame image to a monitor of the gamer.

BRIEF DESCRIPTION OF THE DRAWINGS

The above and other objects and features of the present invention will become apparent from the following description of preferred embodiments given in conjunction with the accompanying drawings, in which:

FIG. 3 exemplifies a composite image produced by an image composition unit in the apparatus for the video-based shooting game in accordance with the present invention.

DETAILED DESCRIPTION OF PREFERRED EMBODIMENTS

Figure 1:
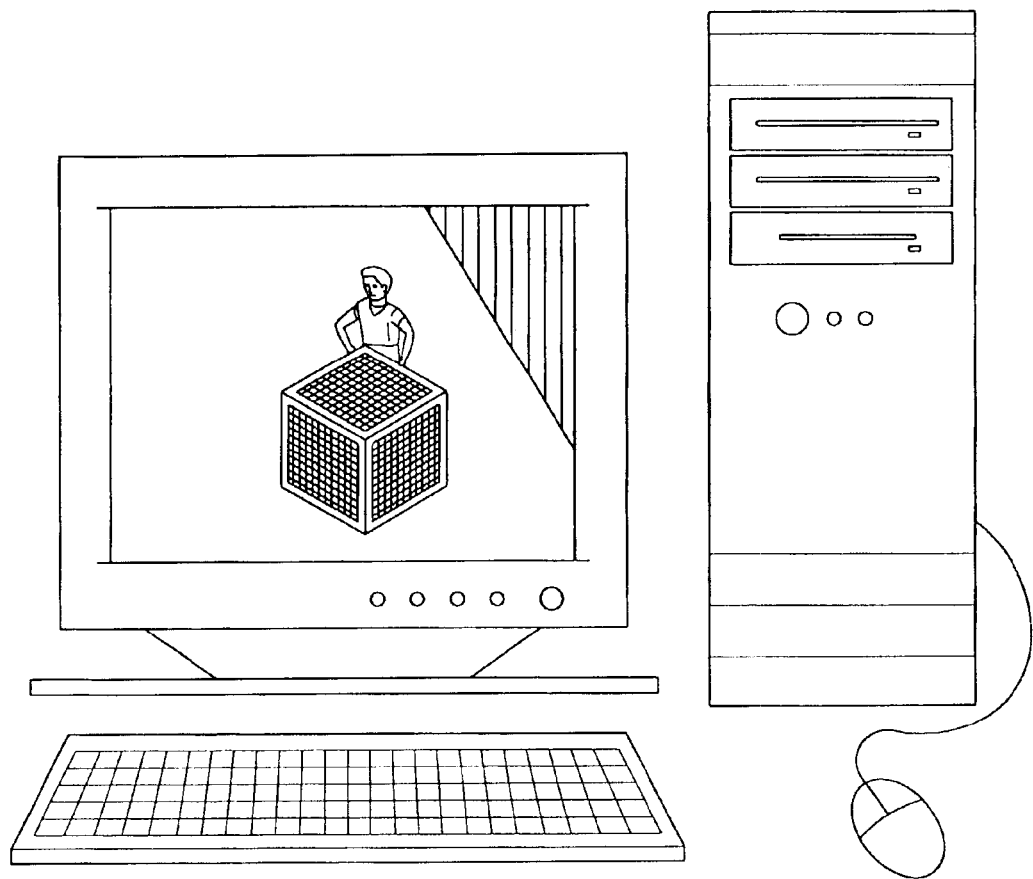
FIG. 1 is a schematic view of a system in which an apparatus and a method for a video-based shooting game are implemented in accordance with the present invention.

Referring to FIG. 1, there is illustrated a system in which a method and an apparatus for a video-based shooting game are implemented in accordance with the present invention. The system includes a monitor for displaying images of an augmented reality, a computer main frame for operating the shooting game and a gun simulator. The gun simulator may be a keyboard, a mouse, a joystick, and the like.

Figure 2:
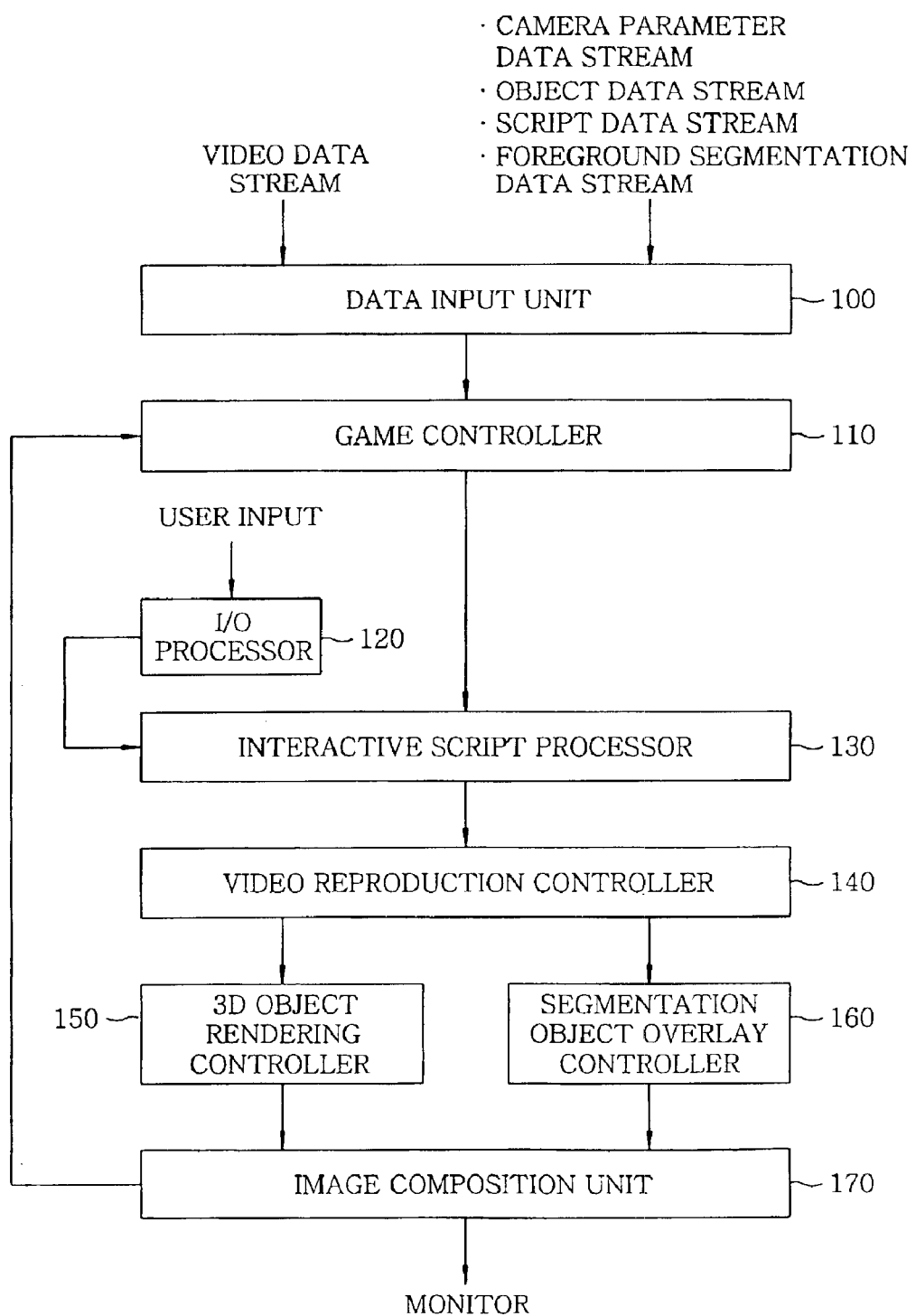
FIG. 2 describes the apparatus for the video-based shooting game in accordance with a preferred embodiment of the present invention.

FIG. 2 describes the video-based shooting game apparatus in accordance with the present invention. The apparatus includes a data input unit 100, a game controller 110, an input/output processor 120, an interactive script processor 130, a video reproduction controller 140, a 3-dimensioanl object rendering controller 150, a segmentation object overlay controller 170 and an image composition unit 170.

The data input unit 100 receives a video data stream obtained by taking a photograph of a background area for the shooting game, a camera parameter data stream attained in a frame unit, an object data stream produced by using computer graphics, a script data stream for managing interactions between a computer and a gamer, and a foreground segmentation data stream to be located at a foreground of a scene.

The video data stream has a form of general moving images. The camera parameter data stream includes external parameters for camera movements in the frame unit and internal parameters. The internal parameters specify a focal length, a picture size, and information upon a distortion of the camera. The external parameters include information upon rotation values and movement values of the camera with respect to axes X, Y, and Z. The foreground segmentation data stream contains information upon an image to be located in front of the object data stream in the video data stream and has an alpha value for setting portions other than the image corresponding to the foreground segmentation data stream to be all transparent. As an example of the object data stream, a 3D graphic data stream has information on 3D graphic modeling data, i.e., a 3D graphic object. The script data stream is text-type data containing information upon movements and actions of an image corresponding to the object data stream taken for every hour.

The game controller 110 proceeds with the game according to a given scenario. Specifically, the game controller 110 provides the interactive script processor 130 with game situation information corresponding to each data stream provided from the data input unit 100 by referring to the scenario.

The input/output processor 120 operates as follows if a trigger input corresponding to a shooting is provided from the gun simulator, e.g., a mouse, a keyboard or a joystick. First, the input/output processor 120 calculates a scene coordinate value for the inputted trigger and then determines whether or not the scene coordinate value belongs to a segmentation object mask. If there is found no alpha value designating transparency when a pixel value for the scene coordinate value is calculated, it is considered that the gamer has hit the segmentation object mask. If the alpha value is found, however, the input/output processor 120 checks whether or not the 3D graphic object is hit. For example, if the gamer shoots at a point A in a composite image as shown in FIG. 3, the input/output processor 120 decides that the inputted trigger has hit the segmentation object mask because there is found no alpha value representing transparency at the scene coordinate value of the point A in the segmentation object mask. Further, since a lower half of the 3D graphic object is hidden behind the segmentation object mask, it is viewed that the 3D graphic object is not hit by the gun simulator. The input/output processor 120 then transfers information about the above-mentioned hitting location by the gun simulator to the interactive script processor 130.

The game controller 110 also transfers the game situation information related to the scenario to the interactive script processor 130. Then, the interactive script processor 130 looks for information that defines actions that should be taken when the 3D graphic object is hit by the gun and provides the found action information to the video reproduction controller 140.

The video reproduction controller 140 operates to quit or start a reproduction of video depending on the found action information.

The 3D object rendering controller 150 performs a rendering of the 3D graphic object by using the camera parameter data stream corresponding to time information of the video being currently reproduced, the time information being provided from the video reproduction controller 140, thereby obtaining a 3D graphic object rendering image. Thereafter, the 3D object rendering controller 150 offers the rendering image of the 3D graphic object to the image composition unit 170.

The segmentation object overlay controller 160 retrieves information on the segmentation object mask corresponding to the time information provided from the video reproduction controller 140 and, then, sends the retrieved information upon the segmentation object mask to the image composition unit 170.

The image composition unit 170 overlays the 3D object rendering image offered from the 3D object rendering controller 150 over an existing video and, then, overlays thereon again the segmentation object mask provided from the segmentation object overlay controller 160, thereby outputting a frame image as illustrated in FIG. 3 to a monitor of the gamer. In other words, by producing a composite video image of the segmentation object mask and the 3D computer graphic object, the 3D graphic object is seen to be located behind the segmentation object mask when it is displayed on the monitor.

As described above, reality of game environment can be highly improved by using the 3D graphic objects three-dimensionally synchronized with the camera while reproducing videos taken by the camera. If an obstacle exists in front of the 3D graphic object, the obstacle being in a picture of an actual place taken by the camera, it is possible to determine whether an inputted trigger hits the obstacle that shields the 3D graphic object. In other words, the obstacle can also be three-dimensionally processed. Further, a high value-added shooting game service can be provided by producing various scenarios with many un-visited place as their settings.

While the invention has been shown and described with respect to the preferred embodiments, it will be understood by those skilled in the art that various changes and modifications may be made without departing from the spirit and scope of the invention as defined in the following claims.

What is claimed is:

1. A method for a video-based shooting game in a computer system, comprising the steps of:
   receiving game data having a video data stream comprising a background for the shooting game, a camera parameter data stream of a frame unit, an object data stream produced by computer graphics, a script data stream for managing interactions between a computer and a gamer, and a foreground segmentation data stream defining a segmentation value that controls display of a foreground and other portions of a scene;
   reproducing the video data stream;
   rendering the object data stream in the frame unit utilizing the camera parameter data stream;
   overlaying the foreground segmentation data stream in said frame unit in order to improve a 3D effect; and
   processing the segmentation value, interactions between the gamer and a gun simulator, and the script data stream to control behaviors of the object data stream.

2. The method of claim 1, wherein the video data stream has a form of moving picture data.

3. The method of claim 1, wherein the camera parameter data stream includes camera external parameters for defining camera movement in the frame unit and camera internal parameters.

4. The method of claim 3, wherein the camera internal parameters include information indicative of a focal length, a screen size and a distortion of the camera.

5. The method of claim 3, wherein the camera external parameters include a rotation value and a movement value of the camera with respect to axes X, Y and Z.

6. A video-based shooting game apparatus in a computer system, comprising:

a data inputting unit for receiving a video data stream obtained by taking a picture of a background for a shooting game, a camera parameter data stream attained in a frame unit, an object data stream produced by computer graphics, a script data stream for managing interactions between a computer and a gamer, and a foreground segmentation data stream defining a segmentation value that controls display of picture information located at a foreground and other portions of a scene;

a game controller for relating game situation information corresponding to each data stream provided from the data inputting unit to a given scenario;

an input/output processor responsive to said segmentation value and a gun simulator for determining whether a certain image of said scene is hit;

an interactive script processor for receiving the game situation information related to the scenario from the game controller and shooting information of the gun simulator from the input/output processor and searching for information specifying actions that should be taken at a time when said certain image of the object data stream is hit by the gun simulator;

a video reproduction controller for ordering to quit or start a reproduction of video depending on action information provided from the interactive script processor;

a 3D object rendering controller for performing a rendering of the object data stream by using the camera parameter data stream corresponding to time information of the video being currently reproduced, the time information being provided from the video reproduction controller, thereby obtaining a 3D object rendering image;

a segmentation object overlay controller for reading information on a segmentation object mask corresponding to the time information provided from the video reproduction controller; and an image composition unit for overlaying the 3D object rendering image provided from the 3D object rendering controller over an existing video and then overlaying thereon an image of the foreground segmentation data stream offered from the segmentation object overlay controller, thereby outputting a frame image to a monitor of the gamer.

7. The apparatus of claim 6, wherein the gun simulator includes at least one input selected from a mouse, a keyboard and a joystick.

8. The apparatus of claim 6, wherein the camera parameter data stream includes camera external parameters for defining camera movement in a frame unit and camera internal parameters.

* * * * *